Jan. 11, 1966   D. D. HAND   3,228,742
ANIMATED MOTION PICTURE METHOD
Filed Oct. 29, 1962   2 Sheets-Sheet 1
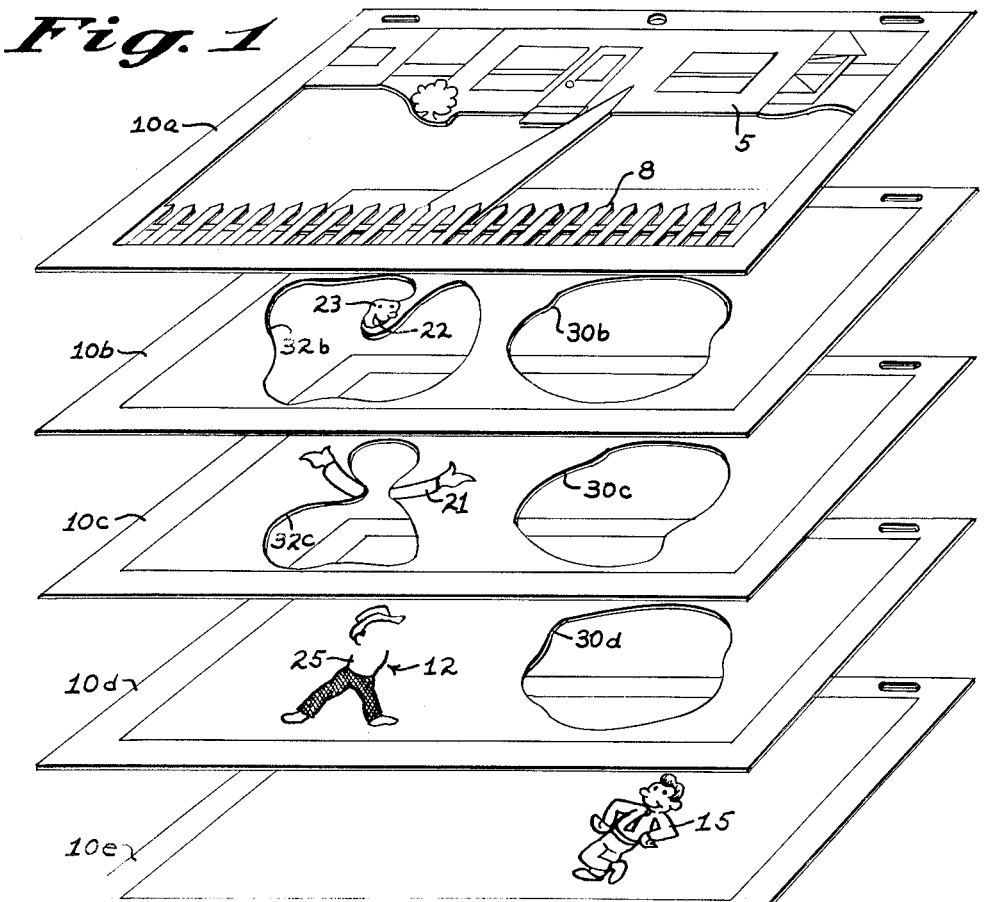
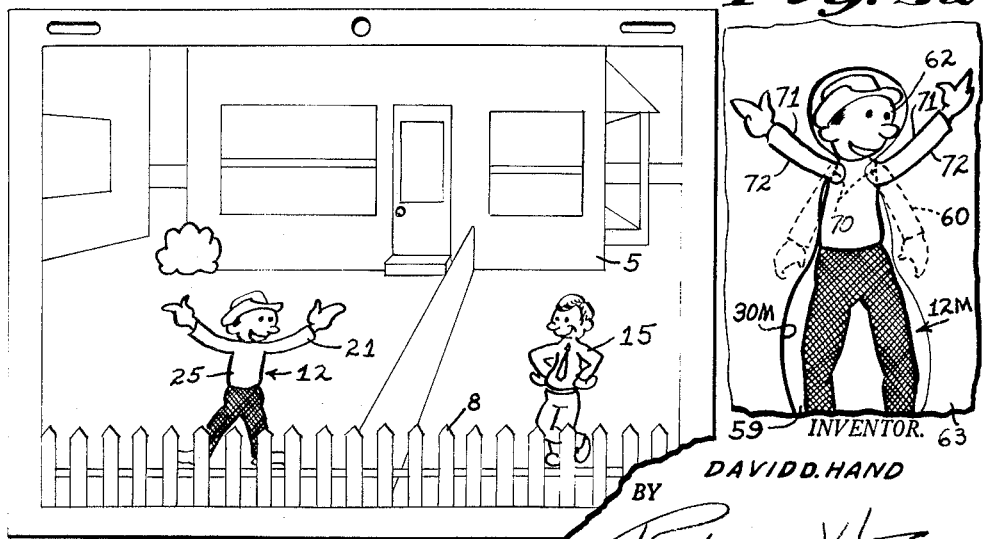
INVENTOR.
DAVID D. HAND
BY
ATTORNEY

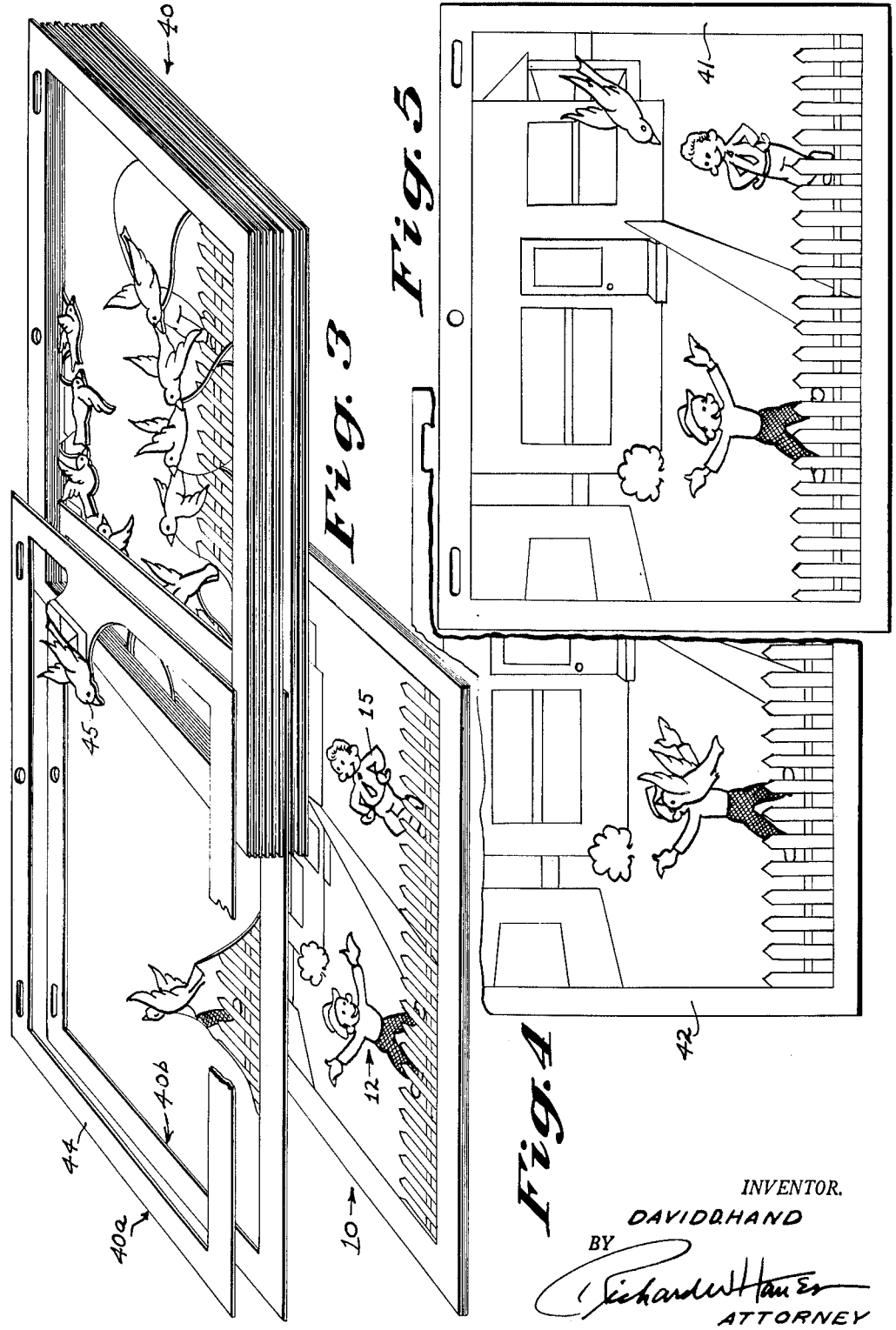

United States Patent Office 3,228,742
Patented Jan. 11, 1966

3,228,742
ANIMATED MOTION PICTURE METHOD
David D. Hand, 23 W. Burgess Road, Black Forest,
Colorado Springs, Colo.
Filed Oct. 29, 1962, Ser. No. 233,568
6 Claims. (Cl. 352—52)

The present invention relates generally to the production of motion pictures of the type generally characterized as animated cartoons or more generally as animated sequential drawings. More specifically, the invention involves an improved and simplified method for composing the individual frames of animation which are separately photographed to form a motion picture film.

The basic fundamentals of animated cartoon production, as taught by John Randolph Bray, and which were disclosed in U.S. Patent No. 1,107,193, issued in 1914, are still employed today. Bray disclosed a method of photographing in succession a series of pictures or drawings which individually show the successive positions which the object of the picture would take if it were in motion. By rapidly projecting on a screen the photographs of the drawings, as by a motion picture film, the person, animal or other object appears to move in the same manner as they do in ordinary motion pictures. However, even in this early work, Bray recognized the economical requirement for reducing the labor necessary to create a single "animated" picture to be photographed, realizing that to produce a complete drawing, including movable characters and objects, background and foreground for each frame of an even moderate length film would be a long and expensive task. Since Bray's efforts, others have made contributions to the field, however, a finished picture representing one frame of the motion picture still represents a considerable labor investment. The generally accepted process of producing animated cartoons involves the use of a plurality of superimposed transparent celluloid sheets on each of which are produced portions or whole units of the composite drawing. The superimposed transparencies are then laid over a drawn or painted background, against which the scene will be played, and are photographed as a complete scene for one frame of the motion picture. While the transparency of the celluloid is necessary to the viewing of all of the superimposed sheets, the transparent effect also produces the disadvantage that the background can be seen through the characters or objects in the picture. Therefore, each of the objects drawn on the celluloid sheet must be made opaque to the light reflected from the background drawing so that the object depicted on the transparent sheet will look as though it is actually in front of the background. To arrive at this point several steps are necessary. An animator's original drawing must be "cleaned up" and traced in ink or otherwise imprinted on the celluloid sheets so that still other artists can paint the back of the inked celluloid to render it opaque against a background drawing. Obviously, the heavy constribution of labor required to produce celluloid overlays sufficient to make a frame of a motion picture is not the only disadvantage of this method. For one thing, each figure or portion thereof which is drawn on any one celluloid sheet must be completely enclosed by a line in order that the less skilled personnel who opaque the figure on the sheet can know exactly where to apply the opaquing paint. Such a requirement calls for lines on some of the sheets which would normally not be required. For example, if an arm were depicted on one sheet and the body to which it attaches were drawn on another, both the arm and the body would have to be defined by a closed line, whereas it would be desirable to merely end the lines on the one sheet at the point they would match the lines on the other mating sheet. Furthermore, as more and more sheets of celluloid are stacked up to produce the desired picture or composite, the transparency of the multiplicity of sheets becomes poor and a lower quality background results. Hence, the primary object of the present invention is to simplify the production of animated cartoons by eliminating the use of transparent sheets of material as a medium on which to produce animated drawings or parts thereof.

In connection with the first mentioned object it is the further purpose of the invention to eliminate the need for making drawings comprised of closed line patterns which define definitive areas for opaquing.

A further object of the invention is to provide a process for animating any given section of an object without having to change or modify the former time sequence drawing of that same section and without having to withdraw the former section drawing from the composite.

As is well known in the art, many scenes are composed of both moving and static objects at the same time, however, scores of frames of the motion picture may show only the motion of one object or character with everything else in the scene remaining stationary. But it is wasteful of time and labor to redraw the static elements of the scene for every frame and hence one further purpose of the present invention is to permit the progressive action of a moving object to be photographed in successive frames by merely creating section drawings containing the successive stop motion positions of the moving parts only, such as the hands, arms, feet, or face, which are inserted into the composite stack in place of their predecessors and photographed.

Another object is to permit the preservation and re-use of the drawings of objects or parts of objects which do not show movement for several frames.

A still further object of the invention is to provide a method of animated cartoon production wherein the animator's original drawings are utilized in the final picture composite.

Still other objects, features and advantages will become apparent from the following description of the invention taken in conjunction with the accompanying drawings in which the steps of the new method are basically illustrated.

Briefly, the process of the present invention of producing animated drawings includes the registered superimposition of a plurality of opaque sheets on each of which is drawn some portion or section of the desired composite picture and wherein the sheets are cut out in certain areas not containing the drawing so as to render the drawing on the underlying sheets visible. The contour of the cutout portion of any sheet may be chosen so as to permit the showing of all of the underlying drawing or it may be precisely defined to cause the opaque sheet in which it is made to cover and thus block from view a section of the underlying drawing which is unwanted in the frame to be composed.

To describe the invention in more detail, reference is made to the accompanying drawings in which:

FIGURE 1 is a perspective exploded view of the segmented drawings, sheets, or "levels" which make up a single composite picture.

FIGURE 2 is a plan view of the composite picture illustrated in FIGURE 1 as the camera would see it.

FIGURE 2a is a fragmentary plan view of of a two-level overlay representing a modified form of the invention.

FIGURE 3 is a diagramatic perspective view of a composite picture having a "foreground," in front of which is placed a sequence of drawings representing the progressive movements of an object in front of the "foreground" mask.

FIGURE 4 is a fragmentary plan view of the composite picture of FIGURE 3 and one overlaid sequence drawing of an object moving in front of the foreground.

FIGURE 5 is a plan view of the composite picture of FIGURE 3 and a second overlaid sequence drawing of an object moving in front of the background.

Referring now to the drawings for a more detailed explanation of the improved method, it will be noted that the explanatory illustration are of extreme simplicity and could not, by themselves, serve to compose more than a few frames of a motion picture, however, the scene illustrated, which depicts a background house 5, a foreground picket fence 8, moving character 12, who wears a hat for identification, and a fixed or stationary character 15, will serve to illustrate the present invention.

The aforementioned picture objects, movable and stationary, are shown together in a composite completed frame 10 in FIGURE 2 which is composed of five separate picture segments or "levels," which are more clearly illustrated in the exploded view of FIGURE 1.

For purposes of explanation it will be assumed that the frame 10 is one of a sequence of frames in the motion picture where two characters 12 and 15 are conversing. The immediate action concerns only the movement of the speaker's arms 21, and mouth 22, while the hatless man 15 remains stationary, as does the background 5 and foreground fence 8. It will be further assumed that the schedule of animation calls for movement of the body of the hat wearing man 12 before any part of the hatless man 15 moves and therefore the body 25 of the moving character is drawn on a separate sheet 10d from the sheet 10e on which the stationary man 15 is drawn. Thus when a changed body position is created for man 12 a new sheet showing the next stop-motion body position is interchanged for the sheet 10d, without having to redraw the stationary figure 15.

The moving arms 21 of the hatted man 12 are illustrated on a separate sheet 10c which, when properly registered with the body 25 on the sheet 10d places the arms in their proper relative position. As the arms move in the schedule of animation, the sheet 10c is replaced in subsequent frames by other similarly constructed sheets showing the arms in successive stop-motion positions, thus creating the illusion of motion when the frames are projected in rapid sequence.

The face 23 of the talking man 12 is drawn on still another sheet 10b so as to be completely independent of the motion of other picture sections. As in the case of the moving arms, the successive stop-motion positions of the mouth 22 and other facial features are each drawn on separate sheets similar to the one 10b illustrated in FIGURE 1. In their proper order, the face drawing sheets take their place in the composite register and are each photographed in one or more frames of the motion picture.

Having explained how the illusion of movement is created, it will be evident that some steps must be taken in overlaying one opaque sheet of "animation" upon another so as not to cover or obscure the wanted drawing on the sheet underneath. By the process here disclosed, the visibility of the lower drawings is maintained by cutting out that portion of the overlay sheet that would cover the drawing below. In the sheets 10b, c, and d, cutouts 30b, 30c, and 30d are made through which all of the stationary character 15 may be seen when the sheets are superimposed in proper registry with the sheet 10e on which the stationary character 15 is drawn. (Systems of peg registry of the segment sheets are well known in the art and will therefore not be discussed in connection with the present disclosure.)

Cutouts 32b and 32c are also made in the sheets 10b and 10c through which the body 25 and other non-movable portions of the man 12 can be seen. The arms 21 and face 23 are so placed on their respective opaque sheets that when overlaid on and registered with the body drawing sheet 10d, the arms and face assume their proper positions with respect to the rest of the body and the hat which the character is wearing.

It will be appreciated at this point in the explanation that the area of the face 23, for example, does not have to be enclosed by a line, as would be required if the same drawing were applied to a sheet of transparent celluloid. In this case the sheet 10b on which the face 23 is drawn is cut out along the "hat line" and when the face is superimposed properly with the body and hat a composite figure results.

To complete the frame an apertured mask 10a overlays the previously referred to superimposed segment sheets. The mask 10a contains the drawing of the static elements of the frame picture which establish the setting for the movable characters or objects which may appear in the sequence from time to time.

A similar mask is disclosed by Bray in U.S. Patent No. 1,179,068, and therefore the use of such a mask per se forms no part of the present inventive improvement except as it is employed with the novel steps of the method herein disclosed. It will be noted that the use of such a mask eliminates the necessity for accurately drawing the objects behind the mask "foreground" and terminating their lines at the exact edge of the foreground object. However, other methods and means are known for producing background and setting and combining a static scene with the animated portions of a drawing and it is not the intent of this disclosure to in any way limit the use of the present process to a specific method of producing setting elements. In fact, there are a great number of uses for this method which require no background or setting at all, such as industrial and machine animatioins.

Where it is desired to represent a movable object passing in front of a portion of the "background" or "foreground" setting, additional overlays may be produced to cover portions of the static scene mask 10a with the drawing of the moving object. Such a technique is illustrated in FIGURE 3 with two individual frames resulting from such method shown in FIGURES 4 and 5. In the exemplary showing of FIGURE 3, a bird enters the scene from the right side of the picture and is scheduled to fly down and across the scene, passing in front of the picket fence 8 and then back toward the direction from which it came. The sequential overlay drawings necessary to produce this illusion of flight are shown generally at 40. The sheet 40a depicts the bird in a position shortly after his entry into the scene as he is flying in front of the background house 5. Since the only function of the sheet overlaying the mask 10a is to project a moving object over the mask 10a it is necessary only to provide a frame 44 which corresponds to and is identical with the frame surrounding the mask 10a and an inwardly projecting tab 45 on which is drawn the moving object. Obviously the moving object itself should obscure the scene or characters behind it, but it is not desirable that the portion of the tab 45 which does not carry the drawing of the moving object should block the scene or object thereunder. To avoid such an effect, that portion of the scene which the tab would cover is drawn on the tab itself in such a manner that when the overlay sheet is registered with the "composite" picture 10, the fragmentary scene on the tab 45 is coincident with that same portion of the scene drawn on the mask 10a or the other segmented sheets comprising the frame 10, which the tab 45 covers.

It should be noted on sheets 40a and 40b that the portions of the background house 5 and the picket fence 8 which would be covered by the tab 45 on which the bird is drawn are redrawn on the tab. The total picture 41 formed from the overlay of sheet 40a on the composite 10 is illustrated in FIGURE 5. An advanced sequential frame 42 is shown in FIGURE 4 which represents the composite obtained from the overlay of sheet 40b on the composite 10. It is to be understood that these illustrations are exemplary only and that the overlay sheets 40 would be individually photographed with the composite 10 to provide a smoothly moving sequence of stop-motion frames which, when rapidly projected, give an illusion of flight. Those skilled in the art will also realize that the underlying segmented sheets creating the movement of other objects in the scene can be changed simultaneously with the overlaid motion sheets to create movement of any object desired.

Referring again to the disclosed method of creating movement in an object or character such as the hatted man 12, it is seen by examining the body drawing 25 on sheet 10d that no arms or face appear therewith, but that these moving parts are all supplied from additional opaque sheets, such as 10b and 10c. An alternative method is suggested by FIGURE 2a wherein a man 12m is drawn on the underling sheet 59 complete with arms 60 and face 62. An overlay sheet 63 shows the arms in a different position and the contour of the cutout portion 30m of the said overlay sheet 63 is arranged to exhibit only that part of the figure which it is desired to show in the later frame and covers the unwanted drawing of the man's arms. In production practice it will seldom be desirable to draw the arms 60 on the same sheet 59 as the drawing of the man's body 12m because of obvious limits placed thereby on the flexibility of use of the sheet 59. Such a showing in FIGURE 2a however, serves to amply illustrate the technique which actually can be used tto advantage. Note in FIGURE 1 that the lines of the upper body 25 are terminated at a point of intersection with a line from the arms 21. Although a very usuable technique it does impose certain limitations as to the possible position of the arms. However, if the body line is made continuous through the arm joint, as shown at 70 in FIGURE 2a, the number of possible arm positions using the same body drawing is increased. This may be more easily understood by recognizing that the bottom and top arm lines do not always meet the body at the same point, but are constantly changed with differing arm positions. Thus, by using a continuous body line 70 there need be no concern that the body line will be long enough to contact the arm line for any given arm position. It is of course undesirable that the portion of the body line 70 between the arm lines 71 and 72 be visible, however, with the cutout technique of the present invention this problem is easily solved. The contour of the overlay sheet 63 is designed so that this opaque sheet will cover the unwanted portion 70 of the body line. Naturally the advantage accruing from this method is not limited to the example just illustrated, but it can be employed in a multitude of cases to present a new section drawing while at the same time obscuring an unwanted line or lines. To cite one further example, a series of successive overlays could be made over the bottom sheet 59 in FIGURE 2a which would be cut out to expose to view all of the man 12m except his head. On that portion of the overlaid sheet which obscured the head would be drawn the next successive stop-motion position of the head.

Having thus described the several useful and novel features of the improved method in connection with the accompanying drawings, it will be seen that many worthwhile objects have been achieved, the most notable of which involve freedom from using transparent sheets with their inherent disadvantages, the elimination of the transferring of animator's drawings to other media, and the substantially unlimited number of "levels" or segment drawings which may comprise a given frame without detriment to the quality of the photographed frame. Although only an elementary example has been shown and described, I realize that certain modifications may well occur to those skilled in the art within the broad teaching hereof; hence, it is my intention that the scope of protection afforded hereby shall be limited only insofar as said limitations are expressly set forth in the appended claims.

I claim:
1. The process of producing motion pictures which includes;
    the producing on each of at least three opaque sheets of material drawn portions of a total scene;
    cutting out parts of all but one of the said sheets so as to allow at least some selected part of the drawn portion on each of the sheets to be visible through the cutouts in the other sheets when the sheets are selectively superimposed in registry one over the other, the sheet having no cutout being on the bottom;
    stacking the sheets in registry and in surface to surface mutual contact so as to form a flat picture for at least one frame of a motion picture film;
    photographing the resulting composite picture;
    removing at least one of said sheets and replacing it in said stack with a similar sheet having a drawing thereon which represents a change in position of at least part of the drawn portion depicted on the sheet which was removed; and
    photographing the resultant composite picture.

2. The process of producing motion pictures which includes;
    producing on each of separate opaque sheets drawn portions of movable objects;
    cutting out parts of the separate opaque sheets in such fashion that when the sheets are superimposed in a given order at least part of the drawn portion on all of the sheets may be observed;
    producing on a sheet of opaque material a static setting containing at least some of the parts of a scene which remain stationary during a series of pictures embodying the scene, a portion of the sheet being cut away to expose to at least partial view the visible drawn portions on the said separate opaque sheets;
    superimposing the separate opaque sheets;
    superimposing the opaque sheet containing the static setting over the said separate opaque sheets; and
    photographing the composite picture formed by the superimpositions.

3. The method of claim 2 and further including the steps of successively substituting for selected one of the separate opaque sheets other opaque sheets having produced thereon a successive position of the portion of the said movable object produced on the sheet being substituted for, said substitution sheets having cutout portions similar to the said sheet being substituted for.

4. The process of producing motion pictures including;
    producing upon a series of opaque sheets a movable object in successive positions;
    producing on at least one opaque sheet an object which is stationary;
    producing cutout portions in each of said series of opaque sheets such that when superimposed on the sheet carrying the stationary object, the stationary object is visible therethrough.

5. The process of claim 4 and further including;
    producing on an opaque sheet a setting for the picture to be formed, including at least some of the stationary elements of the scene;
    producing a mask from the opaque sheet by cutting out a portion thereof sufficient to make portions of underlying drawings visible;
    superimposing the mask on one of the said series of cutout opaque sheets and superimposing those on the opaque sheet carrying the stationary object.

6. The process of claim 5 and further including;
the producing upon a second series of opaque sheets a second movable object in successive positions;
producing a cutout from each of the second series of sheets along the contour of the said movable object and along a line defining a frame around said sheet and a tab connecting the movable object with the frame;
superimposing each of said second series sheets over said mask;
producing on each of the said second series sheets that portion of the composite superimposed picture which is covered by the said tab.

References Cited by the Examiner

UNITED STATES PATENTS

| | | | |
|---|---|---|---|
| 1,179,068 | 4/1916 | Bray | 352—52 |
| 1,655,989 | 1/1928 | Duval | 46—35 |
| 1,898,904 | 2/1933 | Seitz | 352—48 |
| 2,054,414 | 9/1936 | Fleischer | 352—52 |
| 2,075,684 | 3/1937 | Whitman | 352—48 |
| 2,911,220 | 11/1959 | Irwin | 46—35 X |

NORTON ANSHER, *Primary Examiner.*

WILLIAM MISIEK, *Examiner.*